United States Patent
Owsen

[11] 3,889,734
[45] June 17, 1975

[54] SAFETY WHEEL
[75] Inventor: Peter Owsen, Livonia, Mich.
[73] Assignee: Ridonia Wheel, Inc., Livonia, Mich.
[22] Filed: Oct. 4, 1973
[21] Appl. No.: 403,479

[52] U.S. Cl. ............................................. 152/158
[51] Int. Cl. ........................................... B60c 17/04
[58] Field of Search ................................... 152/158

[56] References Cited
UNITED STATES PATENTS

| | | | |
|---|---|---|---|
| 3,049,162 | 8/1962 | Rosenbaum et al. | 152/158 |
| 3,180,391 | 4/1965 | Lindley | 152/158 |
| 3,635,273 | 1/1972 | Patecell | 152/158 |

*Primary Examiner*—Drayton E. Hoffman
*Attorney, Agent, or Firm*—Allan J. Murray

[57] ABSTRACT

An annular track is carried by the rim of a wheel, preferably laterally centered between the edges of the rim. Said track is formed of a strip of material with its ends abutted and secured together. A ring of sheet material, such as a resiliently flexible metal, approximately, concentrically encircles said track, and is outwardly spaced therefrom a predetermined distance. A plurality of spacers is disposed between said ring and said track. Each spacer has its inner end portion adapted to be slidably received on said track for sliding travel in an annular path of rotation about said track, and each spacer has its outer end secured to said ring to maintain the spaced relationship of the ring to said track. Said ring has an outer circumferential surface and a supplementary tire is secured to said circumferential surface, so that the track, ring, spacers, and supplementary tire may be disposed within the area encompassed by the annular chamber formed by a tubeless tire mounted upon said wheel rim. The supplementary tire has an outer load carrying surface normally spaced from the interior surface of the tread area of a tubeless tire, when such tubeless tire is inflated, and capable of engaging upon said inner surface should the tire become deflated.

The sheet material forming the ring, has its ends closely juxtaposed when assembled upon a wheel, and said supplementary tire is formed of a length of material which has its ends abutting when assembled with the ring and spacers on the wheel. Latch means carried by the respective end portions of the ring, for interegagement, when assembled upon a wheel, secure said ring in its assembled position and consequently secure said supplementary tire ends in said abutting relation.

36 Claims, 11 Drawing Figures

PATENTED JUN 17 1975   3,889,734
SHEET 1
FIG. 1
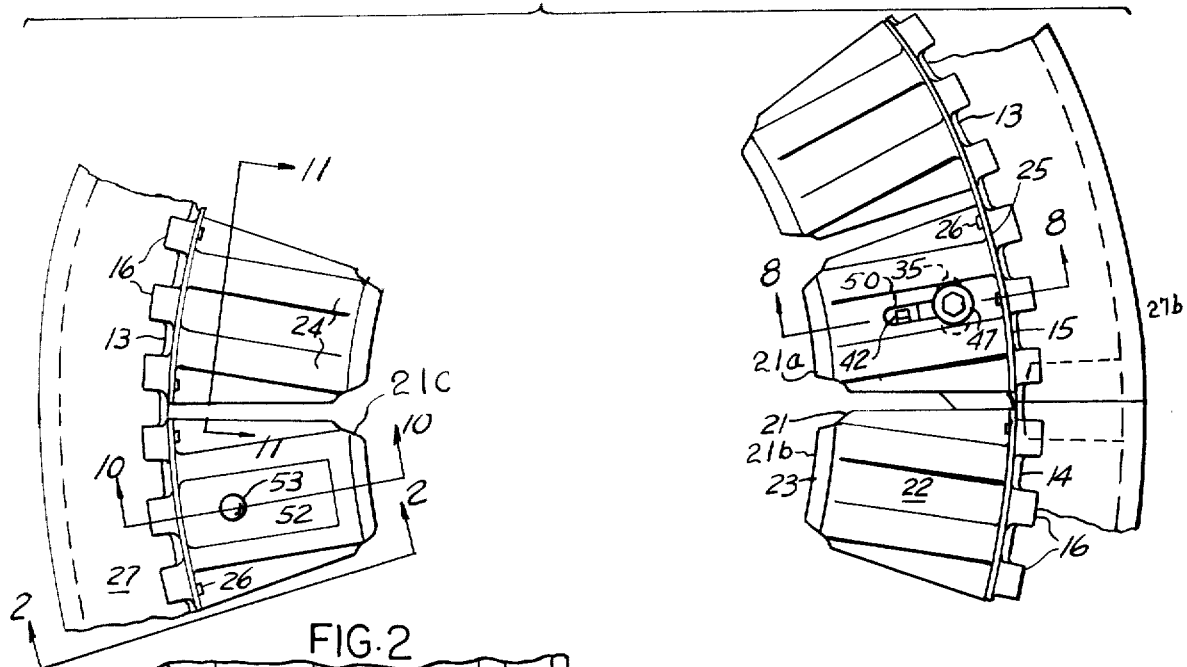
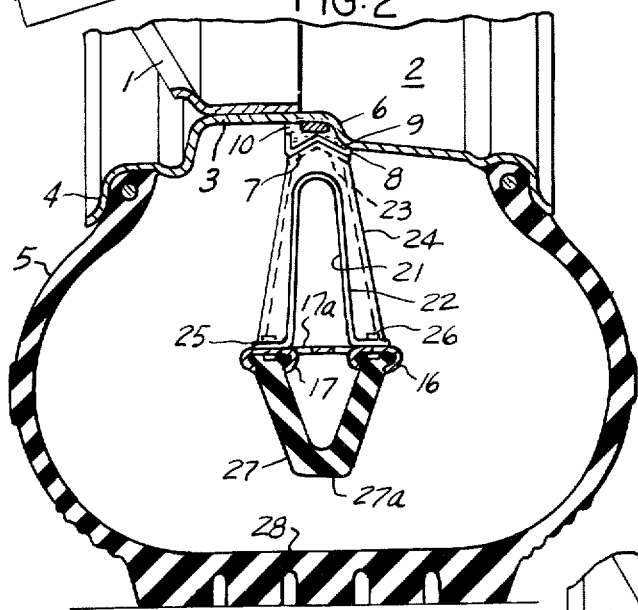
FIG. 2
FIG. 4
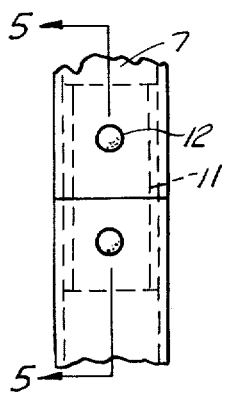
FIG. 5
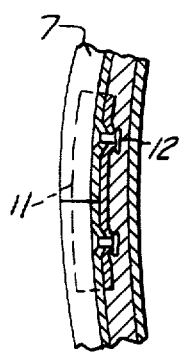
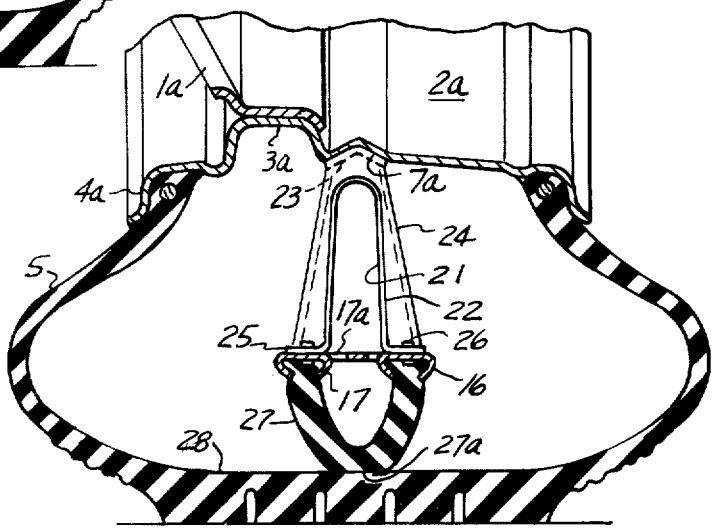
FIG. 3

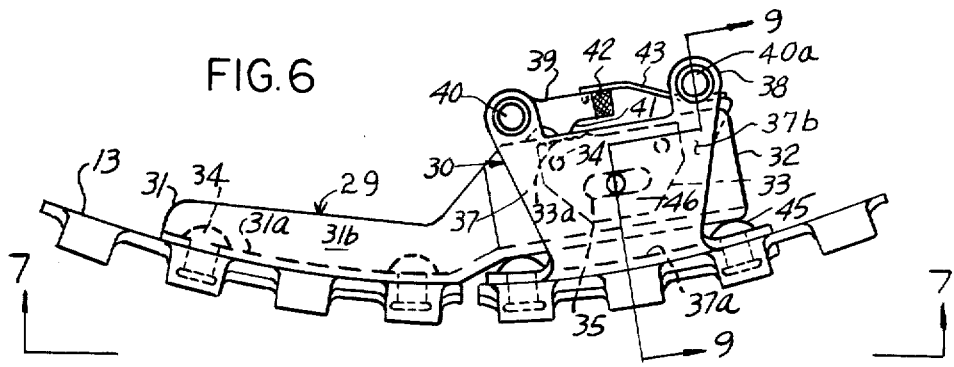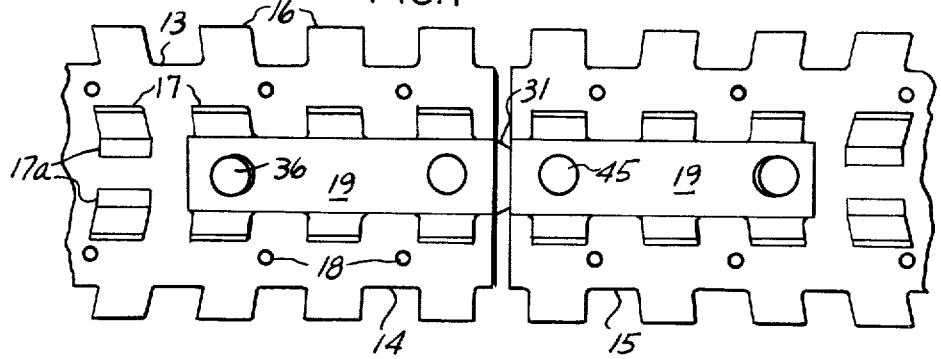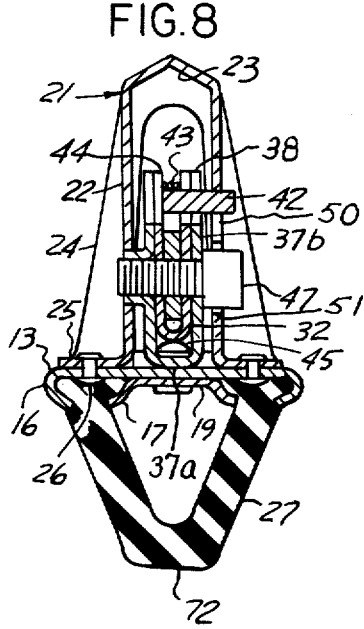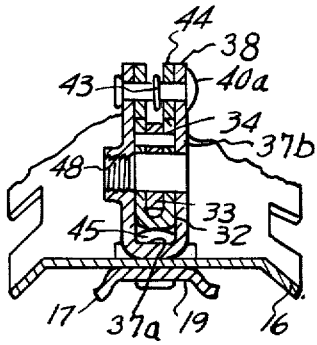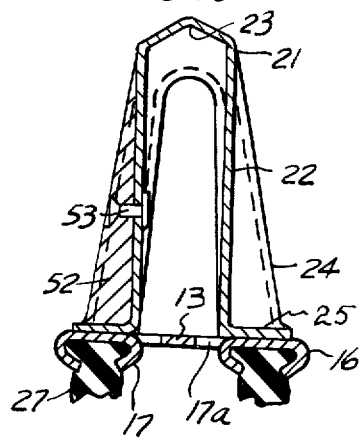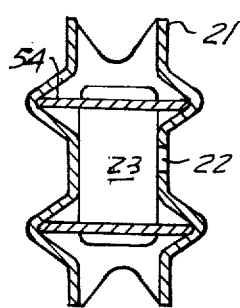

SAFETY WHEEL

BACKGROUND OF INVENTION

The invention lies in the field of devices to be mounted upon the rim of a wheel, such wheel being adapted to receive a tubeless tire, to provide an auxiliary or safety wheel to bear the load (if such tubeless tire becomes deflated) that a vehicle imposes upon such wheel. The purpose, of course, it to provide safety in the event of unexpected deflation, such as occurs with "blow-outs", and to afford a driver better control over his automobile in such an event.

PRIOR ART

Earlier developments in the field appear to stress securing an auxiliary wheel within the toroidal chamber of a tire by securing it rigidly to, and non-revolubly upon the wheel rim. Such earlier designs frequently secure a safety wheel to said rim with screws or the like, and thus increase the likelihood of air seepage through the screw holes. No prior art is known to applicant in which the auxiliary wheel has been designed to be revoluble upon the wheel rim. Such revolubility resolves the problem of passing a circumferential extent of tire tread beneath the point of contact of the auxiliary wheel, and said tire tread, and the running surface upon which a vehicle is moving. This problem arises because such circumferential extent of tire tread remains constant, despite the fact that upon deflation the radial extent from the axis of rotation of the wheel to the tire tread at its point of contact is less than normal, but the full circumferential extent of said tire tread must nevertheless be passed, at said point of contact, if possible, without damage. By the present invention, the auxiliary wheel, or safety wheel, may revolve upon the rim of the conventional wheel at a rate of rotation which may vary as desired, or as is dictated by the rate of rotation of the conventional wheel itself; that is, the auxiliary wheel may rotate faster or slower than the conventional wheel upon which it is mounted thus facilitating the passage of said circumference of tread without damage to said tread.

SUMMARY OF INVENTION

Invention lies in the provision of a track upon the rim of a conventional wheel (or the manufacture of a wheel provided with a track as an annular convolution imposed upon said rim), and in the provision of a ring of flexible sheet material in an approximately concentric relationship to said track, and in a plurality of annular spacers extending between said track and said ring to maintain the relationship of said track and said ring, and slidable about said track, while still affording some flexibility to said ring, and in the provision of gripping fingers upon the outer circumferential surface of said ring to grip the material of a supplementary tire to retain said supplementary tire in its desired position in the assembled safety wheel. To facilitate sliding travel of the device in the track, any friction minimizing coating, such as Teflon, may be used.

This invention is exemplified by the description hereinafter set forth, and is illustrated in the accompanying drawings, wherein:

FIG. 1 is a partial view, illustrating the assembled spacers, the ring, and the supplementary tire, without showing the entire annular extent thereof.

FIG. 2 is a partial, vertical, sectional view taken on line 2—2 of FIG. 1, and illustrating the device as it will appear in such section on a wheel carrying an inflated tubeless tire.

FIG. 3 is a view similar to FIG. 2, showing the device as it will appear upon a wheel with a deflated tubeless tire.

FIG. 4 illustrates the abutting ends of the track, as applied to a wheel rim, to adapt such rim to receive the instant invention.

FIG. 5 is a vertical section taken on line 5—5 of FIG. 4.

FIG. 6 is an elevational view of the juxtaposed ends of said ring, with said latch mounted upon the respective end portions of said ring, and omitting the supplementary tire and the spacers to disclose the latch with greater clarity.

FIG. 7 is a view of the ring and latch taken on line 7—7 of FIG. 6 to disclose details as described hereinafter in the specification.

FIG. 8 is a sectional view taken on line 8—8 of FIG. 1 and rotated approximately 100° clockwise to illustrate the details of the latch mechanism.

FIG. 9 is a partial, elevational, sectional view taken on line 9—9 of FIG. 6 to further illustrate the details of said latch mechanism.

FIG. 10 is a view taken on line 10—10 of FIG. 1 and rotated approximately 80° counterclockwise, to illustrate the application of a weight, counterbalancing the weight of said latch mechanism.

FIG. 11 is a sectional view taken on line 11—11 of FIG. 1 to provide a sectional view of the spacers and reinforcing members carried within said spacers as hereinafter described.

In these views the reference character 1 designates generally a safety wheel including a wheel rim 2, having a usual drop center 3 (FIGS. 2 and 3) formed between the rim edges 4. The rim 2 has its edges 4 adapted to mount a tubeless tire.

In one embodiment of the invention, a strip of steel 6 is formed into an annulus, and welded to the wheel rim at the drop center. A track 7, of a modified V-shape, is then secured in position encircling said strip of steel. Said track is formed of a length of sheet material, and upon installation upon the wheel the ends of said track are abutted, as shown in FIGS. 4 and 5, and are secured together by application of an overlaying V-shaped strip 11 fastened in place by rivets 12, such as pop-rivets.

The track is formed with spaced, parallel flanges, one such flange 8 engages a convolution 9 in the rim and due to the angle at which the rim is formed, said track cannot be dislodged laterally, as to the right, in FIG. 2. The track is positioned in a concentric relationship to the wheel rim, and a filler material 10 is used to fill the space between the track and the wheel rim. It should be noted that the steel strip 6, being welded in position, tends to resist lateral dislodgement of the track and filler material from its position, once said track and material are installed.

With reference now to FIGS. 1, 6, and 7 in particular, it should be noted that a ring 13, preferably formed of a slightly flexible, resilient material is disposed concentrically about the track. Said ring is formed of a strip of sheet material and has its end portions 14 and 15 drawn together with the end faces juxtaposed, and is secured in such position by a latch generally designated as 29, 30 and described in detail hereinafter.

Along each marginal edge portion of the strip of material comprising the ring 13, as may best be seen in FIGS. 6 and 7, is a series of laterally extending fingers 16. Somewhat inwardly from the marginal edge portion there is struck from the ring a series of complementary fingers 17, which leaves consequent holes 17a. Further, as is clearly seen in FIG. 7, supplementary strips 19 are secured to the end portions 14 and 15 of the ring 13, and several of the complementary fingers 17 project laterally from said strip. Rivets 20 secure the strips 19 as well as the latch members 29 and 30 to the end portions of the ring 13, as is shown in FIGS. 6 and 7.

The rivets are of a sizable diameter compared to the strip of material comprising the ring, and the rivet holes necessary for said rivets, when formed in the end portions 14 and 15, could weaken the ends of the strips substantially due to their proximity to some of the holes 17a, if the lateral fingers were struck from the end portions of the ring material. Consequently, to avoid such weakness, supplemental strips 19 are employed.

Disposed between the track 7 and the ring 13 is a plurality of spacers 21 which maintain the approximately concentric spaced relationship of the ring to the track. The spacers are comprised of a pair of parallel side walls 22. Said side walls on each spacer are inwardly, conjoined by an inner end wall 23, which is contoured in a modified V-shape to conform to the shape of the track, to be slidingly received therein. As aforesaid, it is proposed to coat the track, and if desirable said inner end walls 23 with Teflon, or an equivalent material to minimize friction and afford the ready sliding travel of the spacers in the track in an annular path of travel. To increase the strength of the side walls, one or more corrugations 24 may be formed therein. Outwardly said side walls terminate in flanges 25, which are formed with holes, which align with the holes 18 in the ring to receive rivets 26, to secure the spacers to the ring.

A supplementary tire 27 is secured to the outer circumferential face of the ring, as may be clearly seen in FIGS. 2, 3, and 8. Said tire being somewhat of a V-shape, or a truncated triangle in cross section, and having the ends of the legs of the V abutting the outer surface of the ring, with the lateral fingers 16 and the complementary fingers 17 respectively bent inwardly toward each other to grip and secure the tire nonrotatably upon the ring. It is understood, that the entire assembly, supplementary tire, ring, and spacers rotate on the track, but that the tire is non-rotatable with respect to the ring and the spacers. The supplementary tire has a load bearing surface 27a, which may upon deflation of the tubeless tire 5, engage rollingly upon the interior surface 28 of the tread of said tubeless tire. As stated earlier, the fact that the safety wheel has sliding rotative travel on the track 7 affords passage of the tire tread at the point of contact with the surface over which the vehicle is traveling, without subjecting said tire to bending or folding, which is quite detrimental to the material from which the tire is formed. Further, the spacing between the load bearing surface 27a of the supplementary tire and the inner surface 28 of the tread is to be minimized, to reduce the discrepancy between the inner surface of the tread of the tubeless tire and of the load bearing surface of the supplementary tire as much as possible.

Experimental use of the device has shown that upon deflation of the tubeless tire, the device is so effective that a driver might be unaware that the tubeless tire had become deflated. Therefore, it is proposed to insert at the juncture of the ends of the supplemental tire a "thumper" (FIG. 1) 27b, preferably of a material similar to that composing the supplementary tire, and the object of which is to create a thumping noise to alert a driver to the fact that the tubeless tire has become deflated.

The aforementioned latch, comprises a male unit 29 and a female unit 30. The male unit 29 has a base 31 which is formed as a channel having a web 31a laterally terminating in a similar upstanding side walls 31b. A portion of the male unit extends beyond the end portion 14 of the ring, to form a tongue 32 and carries a rachet 33 having on its upper edge rachet teeth 33a. The base 31 is secured, as aforesaid to the end portion 14 of the ring, by means of rivets 34, which also secure one of said supplementary strips 19. Aligned, elongated holes or slots 35 are formed in the rachet 33 and in the walls comprising the tongue 32. The tongue 32 is also U-shaped, but modified to produce higher side walls, with a lesser space therebetween (FIGS. 8 and 9).

The female unit comprises a bracket 37, formed with a web 37a and similar side walls 37b. Each side wall terminates in a pair of ears 38. The respective ears of each side wall being aligned with respective ears of the opposite side wall. One set of said ears carries a pawl 39 having slight rotative travel about the axis of a rivet 40 and formed with a tooth 41 to engage the aforesaid rachet teeth 33a. A knurled finger knob 42 projects laterally from the body of the pawl to afford a means of disengaging the said tooth 41 from the rachet teeth 33a. A spring 43 is mounted on the rivet 40a disposed between a pair of the ears 38, to engage the knurled finger knob, and said spring tends to urge the pawl into engagement with said rachet teeth. If desired, roller spacers 44 may be employed on the rivets 40 and 40a. Rivets 45 extend through the web 37a and the end portion 15 of the ring, to secure the bracket, and one of the aforesaid supplementary strips 19 to said end portion 15.

Holds 46 are formed in a side wall 37b of the bracket, to pass a screw 47 which is intended to extend through the aforesaid holes 35 and has its end portion threadedly received in screw threads 48 formed in one of the said side walls 37b. Obviously, the purpose of the screw is to positively insure against disengagement of the portion of the two units of the latch under stress.

Although the latch in FIGS. 6 and 7 is shown with no spacers, to avoid complicating the views, the latch members are, nevertheless, enclosed within spacers 21a and 21b. It should be noted in FIG. 1 as well as in FIG. 8, that a slot 50 is formed in a side wall of spacer 21b and that the aforesaid knurled finger knob 42 protrudes through that slot to afford access to disengage the pawl tooth 41 from the rachet teeth 33a. To accomodate the head of the screw 47 an enlarged hole 51 is formed in the same side wall of spacer 21b.

The weight of the latch units 29, 30, would, of course, impose imbalance upon the wheel, and to compensate for this, it is proposed to secure a weight 52 on spacer 21c, as shown in FIG. 1, as by means of a rivet 53, or the like.

As stated above, the side walls 22 of the spacers 21 are formed with corrugations 24. It is desired that each corrugation on each side wall be in opposition to a corresponding corrugation on the opposite side wall. As also stated above, one object of the corrugations is additional load bearing strength. Where desired, bulkheads 54 may also be inserted in the spacers, having their edge portions firmly engaged within the corrugations to resist dislodgement therefrom in either direction of the annular path of travel of the spacer as it revolves about the wheel rim. In this connection the flexible resilience of the ring will yield to centrifugal force acting upon the latch units 29, 30, and upon the weight 52 to draw the intervening areas of the ring more tightly against the track, and impose a slight braking effect thereon when the supplementary tire 27 is not carrying the load imposed by the vehicle upon the wheel 1.

The flexibility of the ring further allows dimensioning of the device to afford the least possible space between the load bearing surface of the supplementary tire and the inner surface of the tread area of the tubeless tire. Prior devices are segmented, but otherwise are rigid, and this imposes upon them a limited radial extent due to the necessity of inserting them within the unsecured side of a tire. That is, one bead of a tire is fitted over a rim, and slid to the opposite side of such rim, and the safety device must then be inserted between the free beaded edge of the tire and the rim. The present invention, being flexible, permits of a greater radial extent since the ends of the assembled spacers, ring, and supplementary tire can be coiled inwardly of the wheel rim and then uncoiled inch by inch to be fitted into the space afforded by the tire.

The unit above described is proposed to be employed on currently conventional wheel rims. However, it is also proposed that in the future, wheel rims shall be manufactured as is shown in FIG. 3, wherein the reference character 1a represents the safety wheel generally, with 2a designating the wheel rim, and 3a the drop center. The rim edge 4a is also adapted to receive a tubeless tire. However, it is proposed that the wheel rim be itself contoured to form a track, as at 7a in FIG. 3 and thus avoid the necessity of applying a track to the rim and securing it in position.

What I claim is:

1. A safety wheel for a vehicle, said wheel having a rim to mount a tubeless tire,
    an annular track carried by said rim,
    an annular ring spaced outwardly from and having an approximately concentric relationship with said track,
    a plurality of spacers disposed between said track and said ring to maintain said relationship,
    a radially, inner end portion of each spacer terminating in an inner end wall, said inner end wall being slidably received by said track,
    a pair of opposed, spaced apart side walls extending from each said inner end wall to said ring, to help support the load on said wheel,
    reinforcing means disposed between said side walls to increase the load bearing capacity of each spacer,
    a radially, outer end portion of each spacer being secured to said ring,
    said ring having an outer circumferential surface, and
    an annular supplemental tire mounted upon said circumferential surface, so as to be within the annular chamber formed by a tubeless tire,
    said supplemental tire having a circumferentially extending, load bearing surface, normally spaced from the inner surface of the tread area of an inflated tubeless tire, and being engageable upon said inner surface in free rolling contact therewith, if a tubeless tire is deflated, whereon said supplemental tire, said ring, said spacers, and said track support the load placed upon said wheel.

2. A safety wheel as set forth in claim 1,
    each said reinforcing means being a flat plate, having opposite edge portions, and being laterally disposed between said walls, transversely to said annular path of travel, and
    said side walls being adapted to receive said opposite edge portions and resist escape of said flat plates in either direction of said annular path of travel.

3. In a safety wheel as set forth in claim 2,
    said ring having parallel side portions,
    a series of lateral fingers formed on each side portion,
    a series of companion fingers struck from said strip of material,
    parallel to and complementary to each respective series of lateral fingers,
    each respective series of lateral fingers, and each series of complementary fingers being deformed to grasp a portion of said supplementary tire to maintain said tire in its position on the outer circumferential face of the ring.

4. In a safety wheel as set forth in claim 3,
    means carried by the supplementary tire to effect a reaction upon deflation of a tubeless tire, such reaction being predeterminedly perceptible to an operator of a vehicle employing such safety wheel.

5. In a safety wheel as set forth in claim 4,
    said supplementary tire in cooperation with said ring forming an annular hollow chamber interiorly of said supplementary tire, and
    means inserted into said chamber to create a thumping sound to draw a driver's attention to the deflation of a conventional tire.

6. In a safety wheel for a vehicle, said wheel having a rim to mount a tubeless tire,
    an annular track carried by said rim,
    an annular ring spaced outwardly from and having an approximately concentric relationship with said track,
    a plurality of spacers disposed between said track and said ring to maintain said relationship,
    a radially, inner end portion of each spacer being slidably received in said track, a radially, outer end portion of each spacer being secured to said ring,
    said ring having an outer circumferential surface,
    an annular, supplemental tire mounted upon said circumferential surface, so as to be within the annular chamber formed by a tubeless tire,
    said ring being formed of a strip of resiliently flexible material having ends juxtaposed when said strip is assembled upon said wheel,
    said supplemental tire being composed of a length of suitably resilient material with the ends thereof abutted when assembled upon said wheel, and
    latch means releasably securing the ends of said ring in a juxtaposed relation,
    said latch means including a rachet carried by one end portion of the ring, and a pawl carried by the other end portion of said ring, said rachet and pawl being releasably engageable to maintain the assembled supplementary tire, ring, and spacers, in a mounted position upon said annular track, said supplemental tire having a circumferentially extending, load bearing surface, normally spaced from the inner surface of the tread area of an inflated tubeless tire, and being engageable upon said inner surface in free rolling contact therewith, if a tubeless tire is deflated, whereon said supplemental tire, said ring, said spacers, and said track support the load placed upon said wheel.

7. A safety wheel as set forth in claim 6,
said ring having parallel side portions,
a series of lateral fingers formed on each side portion,
a series of companion fingers struck from said strip of material parallel to and complementary to each respective series of lateral fingers,
each respective series of lateral fingers, and each series of complementary fingers being deformed to grasp a portion of said supplementary tire to maintain said tire in its position on the outer circumferential surface of the ring.

8. In a safety wheel as set forth in claim 6,
means carried by the supplementary tire to effect a reaction upon deflation of a tubeless tire, such reaction being predeterminedly perceptible to an operator of a vehicle employing said safety wheel.

9. A safety wheel as set forth in claim 8,
sais supplementary tire in cooperation with said ring forming an annular hollow chamber interiorly of said supplementary tire, and
means inserted into said chamber to create a thumping sound to draw a driver's attention to the deflation of the conventional tire.

10. A safety wheel as set forth in claim 6,
a base, carrying said rachet, and being mounted on said one end portion of the ring,
a bracket mounted on said other end portion of said ring, to releasably receive said ratchet, said pawl being movably mounted on said bracket for releasable engagement with said ratchet.

11. In a safety wheel as set forth in claim 10,
each radially, inner end portion of each spacer terminating in an inner end wall, said inner end wall being slidably received by said track,
a pair of opposed, spaced apart side walls extending from each said inner wall to said ring, to help support the load on said wheel, and
reinforcing means disposed between said side walls to increase the load bearing capacity of each spacer.

12. In a safety wheel as set forth in claim 11,
each said reinforcing means being a flat plate, having opposite edge portions, and being laterally disposed between said walls, transversely to said annular path of travel, and
said side walls being adapted to receive said opposite edge portions and resist escape of said flat plates in either direction of said annular path of travel.

13. In a safety wheel as set forth in claim 12,
said ring having parallel side portions,
a series of lateral fingers formed on each side portion,
a series of companion fingers srruck from said strip of material, parallel to and complementary to each respective series of lateral fingers,
each respective series of lateral fingers, and each series of complementary fingers being deformed to grasp a portion of said supplementary tire to maintain said tire in its position on the outer circumferential face of the ring.

14. In a safety wheel as set forth in claim 13,
means carried by the supplementary tire to effect a reaction upon deflation of a tubeless tire, such reaction being predeterminedly perceptible to an operator of a vehicle employing such safety wheel.

15. In a safety wheel as set forth in claim 14,
said supplementary tire in cooperation with said ring forming an annular hollow chamber interiorly of said supplementary tire, and
means inserted into said chamber to create a thumping sound to draw a driver's attention to the deflation of a conventional tire.

16. A safety wheel as set forth in claim 10,
said base being disposed between the walls of a first spacer, said spacer being mounted on said one end portion of the ring,
and said bracket being disposed between the walls of a second spacer, said second spacer being mounted upon the said other end portion of said ring,
a tongue, protruding from said base, said rachet being secured to said tongue, and said tongue being received by said bracket and between the walls of said first spacer,
a hole in said tongue,
a hole in said bracket, and
holes in the side walls of said second spacer, said holes being aligned,
a locking element received in said holes to resist escape of the rachet from the pawl.

17. In a safety wheel as set forth in claim 16,
each radially, inner end portion of each spacer terminating in an inner end wall, said inner end wall being slidably received by said track,
a pair of opposed, spaced apart side walls extending from each said inner walls to said ring, to help support the load on said wheel, and
reinforcing means disposed between said side walls to increase the load bearing capacity of each spacer.

18. In a safety wheel as set forth in claim 17,
each said reinforcing means being a flat plate, having opposite edge portions, and being laterally disposed between said walls, transversely to said annular path of travel, and
said side walls being adapted to receive said opposite edge portions and resist escape of said flat plates in either direction of said annular path of travel.

19. In a safety wheel as set forth in claim 18,
said ring having parallel side portions,
a series of lateral fingers formed on each side portion,
a series of companion fingers struck from said strip of material, parallel to and complementary to each respective series of lateral fingers,
each respective series of lateral fingers, and each series of complementary fingers being deformed to grasp a portion of said supplementary tire to maintain said tire in its position on the outer circumferential face of the ring.

20. In a safety wheel as set forth in claim 19,
means carried by the supplementary tire to effect a reaction upon deflation of a tubeless tire, such reaction being predeterminedly perceptible to an operator of a vehicle employing such safety wheel.

21. In a safety wheel as set forth in claim 20,
said supplementary tire in cooperation with said ring forming an annular hollow chamber interiorly of said supplementary tire, and means inserted into said chamber to create a thumping sound to draw a driver's attention to the deflation of a conventional tire.

22. A safety wheel as set forth in claim 16,
said strip of material having sufficient flexible resilience as to afford applying the assembly of ring, supplementary tire, and spacers to the track, and releasably securing it in position on said track by means of said latch.

23. In a safety wheel as set forth in claim 22,
each radially, inner end portion of each spacer terminating in an inner end wall, said inner end wall being slidably received by said track,
a pair of opposed, spaced apart side walls extending from each said inner wall to said ring, to help support the load on said wheel, and
reinforcing means disposed between said side walls to increase the load bearing capacity of each spacer.

24. In a safety wheel as set forth in claim 23,
each said reinforcing means being a flat plate, having opposite edge portions, and being laterally disposed between said walls, transversely to said annular path of travel, and
said side walls being adapted to receive said opposite edge portions and resist escape of said flat plates in either direction of said annular path of travel.

25. In a safety wheel as set forth in claim 24,
said ring having parallel side portions,
a series of lateral fingers formed on each side portion,
a series of companion fingers struck from said strip of material, parallel to and complementary to each respective series of lateral fingers,
each respective series of lateral fingers, and each series of complementary fingers being deformed to grasp a portion of said supplementary tire to maintain said tire in its position on the outer circumferential face of the ring.

26. In a safety wheel as set forth in claim 25,
means carried by the supplementary tire to effect a reaction upon deflation of a tubeless tire, such reaction being predeterminedly perceptible to an operator of a vehicle employing such safety wheel.

27. In a safety wheel as set forth in claim 26,
said supplementary tire in cooperation with said ring forming an annular hollow chamber interiorly of said supplementary tire, and
means inserted into said chamber to create a thumping sound to draw a driver's attention to the deflation of a conventional tire.

28. A safety wheel as set forth in claim 6,
each radially, inner end portion of each spacer terminating in an inner wall, said inner wall being slidably received by said track,
a pair of opposed, spaced apart side walls extending from each said inner wall to said ring, to help support said load and said wheel, and
reinforcing means received between said side walls to increase the load bearing capacity of each spacer.

29. A safety wheel as set forth in claim 28,
each said reinforcing means being a flat plate, having opposite edge portions, and being laterally disposed between said walls, transversely to said annular path of travel, and
said side walls being adapted to receive said opposite edge portions and resist escape of said bulkheads in either direction of the said annular path of travel.

30. A safety wheel as set forth in claim 29,
said ring having parallel side portions,
a series of lateral fingers formed on each side portion,
a series of campanion fingers struck from said strip of material parallel to and complementary to each respective series of lateral fingers,
each respective series of lateral fingers, and each complementary series of fingers, being deformed to grasp a portion of said supplementary tire to maintain said tire in its position on the outer circumferential surface face of the ring.

31. In a safety wheel as set forth in claim 30,
means carried by the supplementary tire to effect a reaction upon deflation of a tubeless tire, such reaction being predeterminedly perceptible to an operator of a vehicle employing such safety wheel.

32. In a safety wheel as set forth in claim 31,
said supplementary tire in cooperation with said ring forming an annular hollow chamber interiorly of said supplementary tire, and
means inserted into said chamber to create a thumping sound to draw a driver's attention to the deflation of a conventional tire.

33. A safety wheel for a vehicle, said wheel having a rim to mount a tubeless tire,
an annular track carried by said rim,
an annular ring spaced outwardly from and having an approximately concentric relationship with said track,
a plurality of spacers disposed between said track and said ring to maintain said relationship,
a radially inner end portion of each spacer being slidably received in said track,
a radially, outer end portion of each spacer being secured to said ring,
said ring having an outer circumferential surface, and
an annular supplemental tire mounted upon said circumferential surface, so as to be within the annular chamber formed by a tubeless tire,
said ring having parallel side portions,
a series of lateral fingers formed on each side portion,
a series of companion fingers struck from said strip of material, parallel to and complementary to each respective series of lateral fingers,
each respective series of lateral fingers, and each series of complementary fingers being deformed to grasp a portion of said supplementary tire to maintain said tire in its position on the outer circumferential face of the ring, said supplemental tire having a circumferentially extending, load bearing surface, normally spaced from the inner surface of the tread area of an inflated tubeless tire, and being engageable upon said inner surface in free rolling contact therewith, if a tubeless tire is deflated, whereon said supplemental tire, said ring, said spacers, and said track support the load placed upon said wheel.

34. In a safety wheel as set forth in claim 33,
means carried by the supplementary tire to effect a reaction upon deflation of a tubeless tire, such reaction being predeterminedly perceptible to an operator of a vehicle employing such safety wheel.

35. In a safety wheel as set forth in claim 34,
said supplementary tire in cooperation with said ring forming an annular hollow chamber interiorly of said supplementary tire, and means inserted into said chamber to create a thumping sound to draw a driver's attention to the deflation of a conventional tire.

36. In a safety wheel as set forth in claim 33, each radially, inner end portion of each spacer terminating in an inner wall, said inner end wall being slidably received by said track, a pair of opposed, spaced apart side walls extending from each said inner wall to said ring, to help support the load on said wheel, and reinforcing means disposed between said side walls to increase the load bearing capacity of each spacer.

* * * * *